United States Patent
Kooi

(10) Patent No.: US 8,909,431 B2
(45) Date of Patent: Dec. 9, 2014

(54) VEHICLE COMPRISING AN AIR CONDITIONING SYSTEM

(76) Inventor: Eeuwe Durk Kooi, Noordwijk (NL)

(*) Notice: Subject to any disclaimer, the term of this patent is extended or adjusted under 35 U.S.C. 154(b) by 497 days.

(21) Appl. No.: 12/863,384

(22) PCT Filed: Jan. 16, 2009

(86) PCT No.: PCT/NL2009/050017
§ 371 (c)(1),
(2), (4) Date: Jul. 16, 2010

(87) PCT Pub. No.: WO2009/091253
PCT Pub. Date: Jul. 23, 2009

(65) Prior Publication Data
US 2011/0046854 A1    Feb. 24, 2011

(30) Foreign Application Priority Data

Jan. 17, 2008 (NL) ........................... 2001192

(51) Int. Cl.
*B60W 10/30*   (2006.01)
*B60W 10/06*   (2006.01)
*B60H 1/32*    (2006.01)

(52) U.S. Cl.
CPC ............ *B60H 1/3208* (2013.01); *B60H 1/3222* (2013.01); *B60H 2001/3266* (2013.01); *B60H 2001/327* (2013.01)
USPC ........ 701/48; 700/276; 123/41.05; 123/41.12

(58) Field of Classification Search
CPC .............. B60H 1/3208; B60H 1/3222; B60H 1/00642; B60H 2001/3266; B60H 2001/327
USPC .......... 701/48; 165/200; 700/276; 123/41.05, 123/41.12
See application file for complete search history.

(56) References Cited

U.S. PATENT DOCUMENTS

| | | | |
|---|---|---|---|
| 5,483,927 A * | 1/1996 | Letang et al. | 123/41.12 |
| 5,501,267 A * | 3/1996 | Iritani et al. | 165/202 |
| 5,904,050 A | 5/1999 | Nathan | |
| 6,016,662 A * | 1/2000 | Tanaka et al. | 62/199 |
| 6,981,544 B2 * | 1/2006 | Iwanami et al. | 165/202 |
| 7,017,360 B2 * | 3/2006 | Kotwicki et al. | 62/133 |

(Continued)

FOREIGN PATENT DOCUMENTS

| | | |
|---|---|---|
| DE | 4214701 A1 | 11/1993 |
| EP | 1437244 A | 7/2004 |
| EP | 1787838 A1 * | 5/2007 |
| EP | 1571022 B1 * | 9/2007 |

OTHER PUBLICATIONS

PCT Patent Application No. PCT/NL2009/050017 filed Jan. 16, 2009 in the name of Kooi, International Search Report and Written Opinion mailed Mar. 3, 2009.

*Primary Examiner* — Tuan C. To
(74) *Attorney, Agent, or Firm* — Levine Bagade Han LLP

(57) ABSTRACT

A vehicle comprising a motor-driven air conditioning system comprising a power control device for controlling the temperature in a space inside the vehicle, and an internal combustion engine equipped with a motor management system that is arranged for determining the energy expended by the internal combustion engine, which internal combustion engine is at the same time used for driving the air conditioning system, characterized in that the motor management system is connected to said power control device and arranged for adjusting the power supplied to the air conditioning system in dependence on the load on the internal combustion engine.

7 Claims, 1 Drawing Sheet

(56) References Cited

U.S. PATENT DOCUMENTS

| | | | |
|---|---|---|---|
| 7,043,931 B2 * | 5/2006 | Plummer | 62/236 |
| 7,216,495 B1 | 5/2007 | Harrison | |
| 7,287,583 B2 * | 10/2007 | Iwanami et al. | 165/202 |
| 7,743,872 B2 * | 6/2010 | Brookman | 180/303 |
| 8,001,799 B2 * | 8/2011 | Obayashi et al. | 62/243 |
| 2002/0084769 A1 | 7/2002 | Iritani et al. | |
| 2005/0044873 A1 * | 3/2005 | Tamai et al. | 62/323.1 |
| 2005/0188717 A1 * | 9/2005 | Aikawa et al. | 62/434 |
| 2005/0255966 A1 * | 11/2005 | Tao et al. | 477/27 |
| 2006/0162352 A1 | 7/2006 | Roehm et al. | |
| 2007/0074595 A1 * | 4/2007 | Sakamoto et al. | 74/339 |
| 2007/0101736 A1 * | 5/2007 | Sawada et al. | 62/230 |
| 2007/0144723 A1 * | 6/2007 | Aubertin et al. | 165/202 |
| 2008/0076342 A1 * | 3/2008 | Bryant et al. | 454/75 |
| 2008/0103667 A1 * | 5/2008 | Suzuki et al. | 701/70 |
| 2008/0105477 A1 * | 5/2008 | Abe | 180/65.2 |
| 2008/0149407 A1 * | 6/2008 | Shibata et al. | 180/65.2 |
| 2009/0064696 A1 * | 3/2009 | Perkins | 62/244 |

* cited by examiner

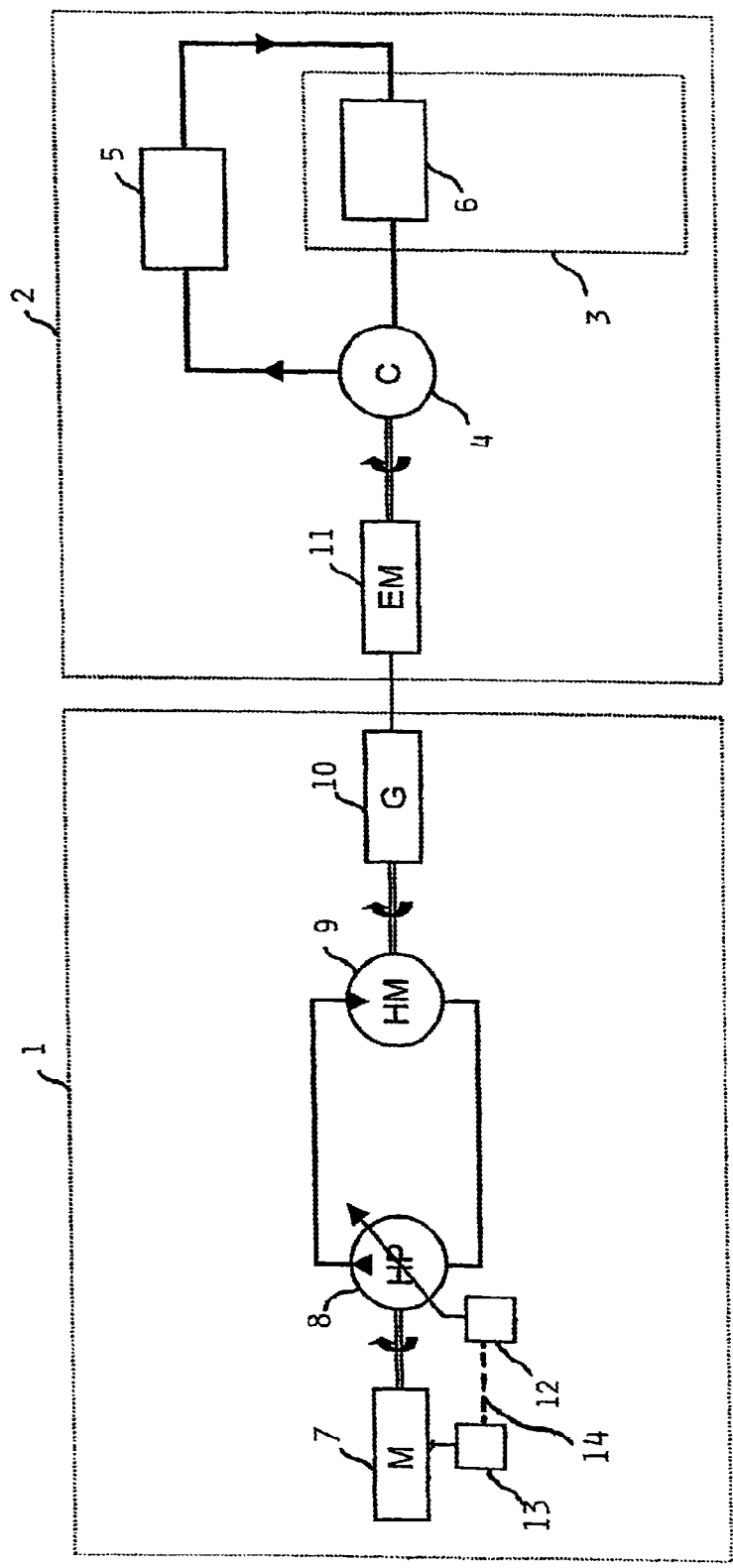

VEHICLE COMPRISING AN AIR CONDITIONING SYSTEM

The invention relates to a vehicle comprising a motor-driven air conditioning system comprising a power control device for controlling the temperature in a space inside the vehicle, and an internal combustion engine equipped with a motor management system that is arranged for determining the energy expended by the internal combustion engine, which internal combustion engine is at the same time used for driving the air conditioning system.

A problem of air conditioning systems in vehicles, in particular refrigeration units for trucks, is that they consume a great deal of energy. Occasionally the user notices that the engine power is not fully available for driving the vehicle.

Accordingly it is an object of the invention to provide an inexpensive and efficient refrigerating system for a vehicle, wherein less energy is lost and more motor power can be used for driving the vehicle.

In order to accomplish that object, the motor management system is connected to said power control device and arranged for adjusting the power supplied to the air conditioning system in dependence on the load on the internal combustion engine.

The power control device is preferably arranged for reducing the power supplied to the air conditioning system when the load on the internal combustion engine increases. The power control device is likewise preferably arranged for reducing the power supplied to the air conditioning system when the load on the internal combustion engine exceeds a predetermined threshold value. The power control device is furthermore preferably arranged for increasing the power supplied to the air conditioning system when the load on the internal combustion engine is negative, which happens, for example, during engine braking of the vehicle.

As a result, the full motor power can be used for driving the vehicle when this is necessary, for example for accelerating or driving uphill.

Furthermore it is possible under all circumstances to supply (part of) the energy that is released during engine braking to the air conditioning system, also if the air conditions are already at the desired level. Less power will be required during the period after said braking in that case, so that a significant energy saving can be realised.

In the preferred embodiment, the power control device comprises a programmable logic controller (PLC), which is connected to the motor management device by means of a CAN bus.

In the preferred embodiment, the air conditioning system is a refrigerating system comprising a closed refrigeration circuit with a compressor driven by the hydraulic motor, a condenser and an evaporator disposed in a space of the vehicle that is to be refrigerated. In the preferred embodiment, the internal combustion engine drives a hydraulic pump, and the refrigerating system comprises a hydraulic motor, which is driven by the hydraulic pump via a hydraulic circuit, whilst the compressor is driven by the hydraulic motor. A controllable hydraulic pump may be used for controlling the power of the refrigerating system, or a controllable hydraulic motor may be used in an alternative embodiment. The hydraulic motor may drive the compressor directly by mechanical means, but it may also be driven electromechanically by means of an electric motor, whose power level is controlled by means of a frequency converter and which is fed by a generator connected to the motor.

It is noted that the term "vehicle" is to be understood to include a vessel or an aircraft, whilst the term "refrigerating" is to be understood to comprise freezing as well.

The invention will now be explained in more detail by means of an embodiment as shown in FIG. 1.

FIG. 1 schematically shows a driven vehicle 1 with a trailer 2, which is provided with a cold storage space 3. Said cold storage space is refrigerated in a known manner by means of a refrigeration unit comprising a refrigeration circuit including a compressor 4, a condenser 5 and an evaporator 6.

The refrigeration circuit operates via the well-known principle of a vapour compression cycle, wherein the pressure and the temperature of the vapour of the refrigerant are increased by the compressor 4, whereupon the refrigerant cools down and condensates in the condenser 5, giving off heat to the environment outside the space to be refrigerated. In the evaporator, the liquid expands and evaporates while absorbing heat from the space to be refrigerated. Subsequently, the vapour at the outlet of the evaporator 6 is carried to the compressor, thus completing the cycle. The evaporator 6 withdraws heat from the cold storage space 3, so that said space is refrigerated.

The compressor 4 obtains the required refrigerating power from the vehicle engine 7, which engine may be a diesel engine, for example, which drives the vehicle (not shown).

The vehicle engine 7 is mechanically coupled to a hydraulic pump 8. Said hydraulic pump 8 has a variable power output, i.e. the power output can be electronically controlled largely independently of the number of revolutions of the vehicle engine and the pump coupled thereto.

The hydraulic pump transmits the power to the hydraulic motor 9 via a hydraulic circuit, which hydraulic motor 9 is mechanically coupled to a 380 V generator 10. Said generator 10 feeds an electric motor 11 in the trailer 2, which mechanically drives the compressor 4. In an alternative embodiment, the hydraulic motor 10 is directly coupled to the compressor 4 by mechanical means, which is advantageous if the cold storage space 3 is located in the same vehicle as the vehicle engine 7.

A power control device 12, which comprises a programmable logic controller (PLC), controls the power level supplied to the hydraulic motor 9 by the hydraulic pump 8. Said programmable logic controller is connected to a motor management system 13 by means of a CAN bus. The motor management system 13 is arranged for measuring the load on the engine 7 and instructing the power control device 12 of the refrigerating system 2 to decrease or, on the contrary, increase the power of the refrigerating system 2 in dependence thereon.

Thus, the power supply to the refrigerating system 2 may be decreased, or be stopped altogether temporarily, in case of a higher load on the engine 7, so that the full engine power remains available for driving the vehicle. The refrigerating power can be reduced when the load on the engine 7 exceeds a predetermined value, or the refrigerating power can be gradually reduced as the load on the engine 7 increases.

On the other hand, additional power can be supplied to the refrigerating system 2 during engine braking of the vehicle, even if the refrigerating space has already reached the desired temperature, so that substantially the full braking energy will be supplied to the refrigerating system 2 at all times.

The invention claimed is:

1. A vehicle comprising a motor-driven air conditioning system comprising a power control device for controlling the temperature in a space inside the vehicle, and an internal combustion engine equipped with a motor management system that is arranged for determining the energy expended by the internal combustion engine, which internal combustion engine is at the same time used for driving the air conditioning system, wherein the motor management system is connected to said power control device and arranged for adjusting the power supplied to the air conditioning system in dependence on the load on the internal combustion engine, wherein the power control device is arranged to control the temperature in said space to maintain a desired temperature and wherein the power control device is arranged to increase refrigerating power of the air conditioning system, even if said space has already reached the desired temperature, during engine breaking.

2. A vehicle according to claim 1, wherein the power control device is arranged for reducing the power supplied to the air conditioning system when the load on the internal combustion engine increases.

3. A vehicle according to claim 1, wherein the power control device is arranged for reducing the power supplied to the air conditioning system when the load on the internal combustion engine exceeds a predetermined threshold value.

4. A vehicle according to claim 1, wherein the power control device is arranged for increasing the power supplied to the air conditioning system when the load on the internal combustion engine is negative.

5. A vehicle according to claim 1, wherein the power control device comprises a programmable logic controller (PLC), which is connected to the motor management device by means of a CAN bus.

6. A vehicle according to claim 1, wherein the air conditioning system is a refrigerating system comprising a closed refrigeration circuit with a compressor driven by the hydraulic motor, a condenser and an evaporator disposed in a space of the vehicle that is to be refrigerated.

7. A vehicle according to claim 6, wherein the internal combustion engine drives a hydraulic pump, and the refrigerating system comprises a hydraulic motor, which is driven by the hydraulic pump via a hydraulic circuit, whilst the compressor is driven by the hydraulic motor.

\* \* \* \* \*